(12) United States Patent
Wang

(10) Patent No.: US 9,838,717 B2
(45) Date of Patent: Dec. 5, 2017

(54) METHOD AND SYSTEM FOR FILTERING IMAGE NOISE OUT

(71) Applicant: Spreadtrum Communications (Tianjin) Co., Ltd., Tianjin (CN)

(72) Inventor: Wei Wang, Tianjin (CN)

(73) Assignee: Spreadtrum Communications (Tianjin) Co., Ltd., Tianjin (CN)

( * ) Notice: Subject to any disclaimer, the term of this patent is extended or adjusted under 35 U.S.C. 154(b) by 0 days.

(21) Appl. No.: 14/983,893

(22) Filed: Dec. 30, 2015

(65) Prior Publication Data

US 2016/0196477 A1   Jul. 7, 2016

(30) Foreign Application Priority Data

Dec. 30, 2014   (CN) .......................... 2014 1 0847793

(51) Int. Cl.
   *G06K 9/00* (2006.01)
   *H04N 19/80* (2014.01)
   *G06T 5/00* (2006.01)
   *G06T 5/20* (2006.01)

(52) U.S. Cl.
   CPC ............. *H04N 19/80* (2014.11); *G06T 5/002* (2013.01); *G06T 5/20* (2013.01); *G06T 2207/10024* (2013.01); *G06T 2207/20012* (2013.01)

(58) Field of Classification Search
   CPC . G06T 5/002; G06T 5/20; G06T 2207/10024; G06T 2207/20012; G06T 7/408; G06T 5/00; G06T 7/60; G06K 2009/4666; G06K 9/4652; G06K 9/6215; G06K 9/52; H04N 19/80; H04N 19/70
   See application file for complete search history.

(56) References Cited

U.S. PATENT DOCUMENTS

| | | | |
|---|---|---|---|
| 6,535,632 B1* | 3/2003 | Park | G06K 9/32 358/515 |
| 8,467,003 B2* | 6/2013 | Yoo | G06T 5/20 348/701 |
| 8,639,054 B2* | 1/2014 | Hasegawa | G06T 5/002 348/221.1 |
| 2008/0123989 A1* | 5/2008 | Lin | G06T 5/002 382/275 |
| 2010/0086205 A1* | 4/2010 | Yamagata | G06T 5/20 382/167 |
| 2016/0239942 A1* | 8/2016 | Usman | H04N 19/80 |

* cited by examiner

*Primary Examiner* — Yon Couso
(74) *Attorney, Agent, or Firm* — McKee, Voorhees & Sease, PLC

(57) ABSTRACT

The present invention discloses a method and system for filtering image noise; the system includes: an image acquisition unit, a judgment unit, a first filtering unit, a second filtering unit and a selecting unit; the steps includes: selecting a pixel in one of the color channels in YUV image to detect; according to all the pixels in the N*M matrix which centers on the pixel currently detected, judging whether the pixel is in a flat region; and if the pixel is in a flat region, according to the Y-component of all the pixels inside the N*M matrix, calculating and outputting the filtering strength parameter of the pixel, and then filtering the pixel according to the filtering strength parameter; the positive effects of the mentioned technical scheme are: easy in calculation; retaining image details efficiently, restoring the original color of image and improving the quality of the filtered image after filtering.

13 Claims, 4 Drawing Sheets

| $U_{0,0}$ | $U_{0,1}$ | $U_{0,2}$ |
|---|---|---|
| $U_{1,0}$ | $U_{1,1}$ | $U_{1,2}$ |
| $U_{2,0}$ | $U_{2,1}$ | $U_{2,2}$ |

| $U'_{0,0}$ | $U'_{0,1}$ | $U'_{0,2}$ |
|---|---|---|
| $U_{1,0}$ | $U_{1,1}$ | $U_{1,2}$ |
| $U_{2,0}$ | $U_{2,1}$ | $U_{2,2}$ |

| $Y_{0,0}$ | $Y_{0,1}$ | $Y_{0,2}$ |
|---|---|---|
| $Y_{1,0}$ | $Y_{1,1}$ | $Y_{1,2}$ |
| $Y_{2,0}$ | $Y_{2,1}$ | $Y_{2,2}$ |

METHOD AND SYSTEM FOR FILTERING IMAGE NOISE OUT

CROSS-REFERENCE TO RELATED APPLICATIONS

The present application claims priority to and the benefit of Chinese Patent Application No. CN 201410847793.0, filed on Dec. 30, 2014, the entire content of which is incorporated herein by reference.

BACKGROUND OF THE INVENTION

1. Field of the Invention

The invention relates to the field of image processing technology, specifically, to a method and system for filtering image noise out.

2. Description of the Related Art

In the prior art, the image noise may be generated in every step of the process of digital image acquisition, and affect the result of finally imaging, which reduces the image quality. Therefore, in order to improve the image quality, it is necessary to restrain and eliminate the image noise during imaging.

In the prior art, the most common method for eliminating the noise is to eliminate the noise by designing a filter. The noise filtering methods in the prior art generally bring the problems of difficult in calculation and large in calculation process during restraining the noise, while it may also lose some details of the original image, which makes the image blur and the image quality degraded.

SUMMARY OF THE INVENTION

Considering the problem existing in the prior art, the present invention provides a system and method for filtering image noise out. The purpose of the invention is to improve validity of filtering, reducing the effect of image noise to the normal color in the image and ensuring the image resolution.

The technical schemes mentioned above include:

A method for filtering image noise out, comprising:

acquiring a YUV image, and performing image noise filtering process to an unfiltered pixel in a color channel in the image as follows;

judging the pixel currently detected in accordance with all the pixels in a preset N*M matrix centering on the pixel currently detected; if the pixel currently detected is in a flat region, performing the following steps:

step S1, calculating and outputting a filtering strength parameter which is corresponding to the pixel currently detected in accordance with a Y-component of all the pixels in the N*M matrix;

step S2, filtering the pixel currently detected in accordance with the filtering strength parameter;

step S3, accomplishing the image noise filtering process performed to the pixel in the color channel;

wherein, N≥3, M≥3, and both N and M are odd numbers.

Preferably, the above method, wherein, after performing step S3, performing the steps as follows:

judging whether to perform the image noise filtering process to every pixel in the color channel in the image;

if not performing the image noise filtering process to every pixel in the color channel in the image, turning to detect a pixel which has not been detected; and performing steps S1 to S3 once it is determined that the pixel currently detected is in a flat region.

Preferably, the above method, wherein, if performing the image noise filtering process to every pixel in the color channel in the image, performing the steps as follows:

judging whether to perform the image noise filtering process to every color channel in the image;

if not performing the image noise filtering process to every color channel in the image, turning to a next color channel, and selecting a pixel in the next color channel to detect; and performing steps S1 to S3 once it is determined that the pixel currently detected is in a flat region.

Preferably, the above method, wherein, if the pixel currently detected is not in a flat region in accordance with all the pixels in the preset N*M matrix centering on the pixel currently detected, performing the step as follows:

performing an average filtering to the pixel currently detected, and then turning to step S3.

Preferably, the above method, wherein judging whether the pixel currently detected is in a flat region comprises:

calculating a difference value in the maximum range of the pixel corresponding to the pixel currently detected in accordance with all the pixels in the preset N*M matrix, and judging whether the difference value in the maximum range is less than a preset first threshold, and then outputting a corresponding first judgment result;

calculating a variance value of all the pixels in the preset N*M matrix, and judging whether the variance value is less than a preset second threshold, and then outputting a corresponding second judgment result;

calculating and judging whether maximum distance between values of filtered pixels in first row of a preset 3*M matrix is less than a preset third threshold value, and then outputting a corresponding third judgment result;

when judging whether the pixel currently detected is in a flat region, also judging the following in accordance with the first judgment result, the second judgment result and the third judgment result:

if the difference value in the maximum range is less than the first threshold, and the variance value is less than the second threshold, and the maximum distance is less than the third threshold, it is determined that the pixel currently detected is in a flat region; and otherwise, it is determined that the pixel currently detected is not in a flat region.

Preferably, the above method, wherein calculating the difference value in the maximum range in accordance with the following formulas:

$$h=|a_1-a_2|;$$

wherein, $$a_1 = \sum_{i=0,j=0}^{i \le \frac{N-3}{2}, j \le M-1} X_{i,j};$$

$$a_2 = \sum_{i=\frac{N+1}{2},j=0}^{i \le N-1, j \le M-1} X_{i,j};$$

$X_{i,j}$ represents a value of a pixel which is located at (i+1)th row and (j+1)th column of the preset N*M matrix in the color channel;

$$v=|b_1-b_2|;$$

wherein, $$b_1 = \sum_{i=0,j=0}^{i \le N-1, j \le \frac{M-3}{2}} X_{i,j};$$

-continued $$b_2 = \sum_{i=0, j=\frac{M+1}{2}}^{i \pounds N-1, j \pounds M-1} X_{i,j};$$

then calculating maximum value max (h, v) between h and v as the difference value in the maximum range.

Preferably, the above method, wherein calculating the variance value in accordance with the following formula:

$$X_{var} = \sum_{i=0, j=0}^{i=N-1, j=M-1} \left( X_{i,j} - X_{(\frac{N-1}{2}),(\frac{M-1}{2})} \right);$$

wherein, $X_{var}$ represents the variance value of all the pixels included in the preset N*M matrix in the color channel;

$$X_{(\frac{N-1}{2}),(\frac{M-1}{2})}$$

is the value of the pixel currently detected in the preset N*M matrix in the color channel;

$X_{i,j}$ represents a value of a pixel located in (i+1)th row and (j+1)th column of the preset N*M matrix in the selected color channel.

Preferably, the above method, wherein calculating the maximum distance in accordance with the following formulas:

$$\max\_X' = \max(X'_{0,0}, X'_{0,1}, \ldots, X'_{0,A});$$

$$\min\_X' = \min(X'_{0,0}, X'_{0,1}, \ldots, X'_{0,A});$$

wherein, $A \pounds M-1$, $X'_{0,A}$ represents the value of filtered pixels in first row and (A+1)th column of the preset 3*M matrix;

then:

$$X_{\mathit{diff}1} = \left| \max\_X' - X_{1,(\frac{M-1}{2})} \right|;$$

$$X_{\mathit{diff}2} = \left| \min\_X' - X_{1,(\frac{M-1}{2})} \right|;$$

and the maximum distance is:

$$X_{max\_diff} = \max(X_{\mathit{diff}1}, X_{\mathit{diff}2});$$

judging whether $X_{max\_diff}$ is less than the corresponding third threshold, and outputting the corresponding third judgment result.

Preferably, the above method, wherein step S1 comprises:

step S11, calculating a middle filtering strength parameter in accordance with a Y-component of the pixel;

step S12, calculating out a final filtering strength parameter in accordance with the middle filtering strength parameter, and then turning to step S2.

Preferably, the above method, wherein in step S11, calculating the middle filtering strength parameter in accordance with the following formulas:

$$c_y = \begin{cases} c_1 + (th_4 - y_{cur}) * (c_2 - c_1)/th_4 & y_{cur} < th_4 \\ c_1 & y_{cur} \ddag th_4 \end{cases};$$

wherein, $c_y$ represents the middle filtering strength parameter;

$c_1$ and $c_2$ are preset threshold values;

$c_1 \pounds c_y \pounds c_2$;

$0 < c_1 < c_2 < 1$;

$th_4$ represents the preset forth threshold value;

$y_{cur}$ represents an average brightness of all the pixels, which includes the pixel currently detected in the color channel, in the preset N*M matrix:

$$y_{cur} = \frac{1}{N*M} * \sum_{i=0, j=0}^{i<N, j<M} y_{i,j};$$

$y_{i,j}$ represents Y-component of the pixel in the (i+1)th row and (j+1)th column of the preset N*M matrix.

Preferably, the above method, wherein in step S12, calculating the filtering strength parameter in accordance with the following formula:

$$c = \begin{cases} c_y & X_{max\_diff} \pounds th_5 \\ \frac{(c_y - c_3) * (th_6 - X_{min\_diff})}{th_6 - th_5} & th_5 < X_{max\_diff} < th_6 \\ c_3 & X_{max\_diff} \ddag th_6 \end{cases};$$

wherein, c represents the filtering strength parameter;

$c_3$ is the preset threshold value;

$c_3 \pounds c \pounds c_y$;

$0 < c_3 < c_y < 1$;

$X_{max\_diff}$ represents the maximum distance between the pixel current detected and a value of the filtered pixel in first row of the preset 3*M matrix:

$th_5$ is a preset fifth threshold;

$th_6$ is a preset sixth threshold;

$th_5 < th_6 \pounds th_3$.

Preferably, the above method, wherein in step S2, performing the image noise filtering process to the pixel currently detected in the color channel with the preset 3*M matrix in accordance with the following formula:

$$X'_{1,(\frac{M-1}{2})} = \frac{1}{M} * \sum_{j=0}^{j<M} (c^2 * X'_{0,j} + c*(1-c)*X_{1,j} + (1-c)*X_{2,j});$$

wherein, $$X'_{1,(\frac{M-1}{2})}$$

represents a value of the filtered pixel in the color channel currently detected in the preset 3*M matrix.

Preferably, the above method, wherein the average filtering comprises:

step S31, calculating distances between the pixel currently detected and each of the pixels in the preset N*M matrix centering on the pixel currently detected;

Step S32, comparing distances between each pixel and the pixel currently detected with a preset seventh threshold value individually:

if the distance is less than the seventh threshold value, setting a weight of the corresponding pixel as 1;

if the distance is not less than the seventh threshold value, setting a weight of the corresponding pixel as 0;

step S33, performing a corresponding average filtering to the pixel currently detected in accordance with the pixel whose weight is 1 in the preset N*M matrix for the current detected pixel, and then turning to step S3.

Preferably, the above method, wherein performing the average filtering to the pixel currently detected in accordance with the following formulas:

$$X'_{(\frac{N-1}{2}),(\frac{M-1}{2})} = \frac{1}{P} * \sum_{i=0, j=0}^{i=N-1, j=M-1} X_{i,j};$$

$$X'_{(\frac{N-1}{2}),(\frac{M-1}{2})}$$

represents the value obtained after the pixel currently detected in the preset N*M matrix is filtered;

$X_{ij}$ represents a value of the pixel in (i+1)th row and (j+1)th column of the preset N*M matrix;

P represents that, in the N*M matrix, there are pixels, of which the number is P, satisfying:

$$\left|X_{i,j} - X_{(\frac{N-1}{2}),(\frac{M-1}{2})}\right| < th_7;$$

wherein, $th_7$ represents the preset seventh threshold.

Preferably, the above method, wherein in step S2, performing IIR (Infinite Impulse Response) filtering to the pixel of the color channel in accordance with the filtering strength parameter.

A system for filtering image noise out, comprising:
an image acquisition unit, configured to acquire RGB images to be processed, and convert the RGB images into a YUV color system;

a judgment unit, connected to the image acquisition unit, configured to judge whether a pixel currently detected is in a flat region in accordance with all pixels in a preset N*M matrix which centers on the pixel currently detected, and output a corresponding judgment result;

a first filtering unit, configured to calculate out a corresponding filtering strength parameter in accordance with all the pixels in the preset N*M matrix which centers on the pixel currently detected, and to filter the pixel currently detected in accordance with the filtering strength parameter;

a starting unit, connected to the judgment unit and the first filtering unit, configured to start the first filtering unit in accordance with the judgment result if the pixel currently detected is in a flat region.

Preferably, the above system, further comprising:
a second filtering unit, connected to the starting unit, configured to perform an average filtering to the pixel currently detected;

wherein, the starting unit starts the second filtering unit in accordance with the judgment result if the pixel currently detected is not in a flat region.

Preferably, the above system, wherein the judgment unit comprises:

a first judgment module, configured to calculate a difference value in maximum range corresponding to the pixel currently detected in accordance with all the pixels of the preset N*M matrix, and to judge whether the difference value in the maximum range is less than a preset first threshold; and to output a corresponding first judgment result;

a second judgment module, configured to calculate a variance value of all the pixels in the preset N*M matrix, and to judge whether the variance value is less than a preset second threshold, and to output a corresponding second judgment result;

a third judgment module, configured to calculate and judge whether a maximum distance between the value obtained after the pixel in first row of a preset 3*M matrix is filtered and the pixel currently detected is less than a preset third threshold, and to output a corresponding third judgment result;

wherein, the judgment unit judges the following in accordance with the first judgment result, the second judgment result and the third judgment result:

if the difference value in the maximum range is less than the first threshold, and the variance value is less than the second threshold, and the maximum distance is less than the third threshold, the judgment unit judges that the pixel currently detected is in a flat region; and otherwise, the judgment unit judges that the pixel currently detected is not in a flat region.

Preferably, the above system, wherein the first filtering unit comprises:

a first calculation module, configured to calculate a middle filtering strength parameter corresponding to the pixel currently detected in accordance with all the pixels in the preset N*M matrix;

a second calculation module, connected to the first calculation module, configured to calculate a filtering strength parameter corresponding to the pixel currently detected in accordance with the middle filtering strength parameter;

a first filtering module, connected to the second calculation module, configured to filter the pixel currently detected in accordance with the filtering strength parameter.

Preferably, the above system, wherein the first filtering module performs IIR (Infinite Impulse Response) filtering to the pixel currently detected in accordance with the filtering strength parameter, Preferably, the above system, wherein the second filtering unit comprises: a third calculation module, configured to calculate distances between all the pixels in the preset N*M matrix and the pixel currently detected;

a comparison module, connected to the third calculation module, configured to compare the distances corresponding to each pixel to a preset threshold, and to discard pixel values which are not less then the threshold;

a second filtering module, connected to the comparison module, configured to perform average filtering to the pixel currently detected in accordance with the values of the pixels, which are not discarded, in the preset N*M matrix.

The positive effects of the above technical schemes are:
1. By using the way of judging whether the pixel of the image is in a flat region to judge the image boundary so that the filtering strength is varied at the boundary and the filtering is natural;

2. It is easy to calculate and the operand thereof is little since the corresponding filtering strength is calculated in accordance with the brightness value of all the pixels in the N*M matrix when the pixel of the image is in a flat region;

3. When the pixel of the image is in a flat region, according to brightness value of all the pixels in the N*M matrix, it can reserve the image detail while filtering, and recover the original color, and improve the image quality after filtering.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
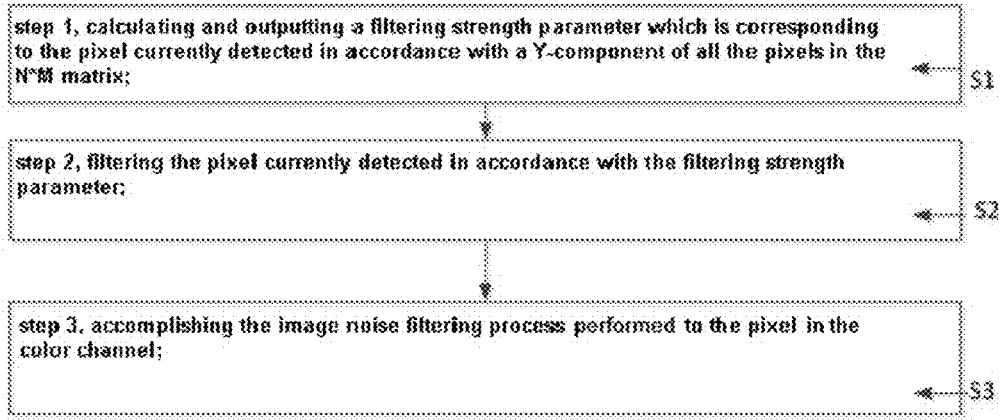
FIG. 1 is an overall flow diagram of a method for filtering image noise out in a preferred embodiment of the present invention.

It is described clearly and entirely for the technical solution of the invention with the accompanying drawings. Obviously, the described embodiments of the invention are part of the embodiments, and not the complete embodiments. Based on the embodiments of the invention, all the other embodiments obtained by the people skilled in the art without creative efforts fall in the scope of the invention.

It is noted that the embodiments and the features thereof can be combined with each other without conflicting.

It is described clearly and entirely for the technical solution of the invention with the accompanying drawings and embodiments, and not for limiting the invention.

In prior art, digital camera, mobile camera and computer camera are more or less interfered by noise during the process of image acquisition.

Generally, the image noise can be divided into two species: luma noise and color noise. The luma noise appearing in acquired image is a series of granular spots which are rough and without color; the color noise appearing in acquired image is a series of random color spots. The appearance of the noise may cause the reduction of the image definition so that the image quality of digital acquisition image is also affected.

In prior art, it generally designs filters for filtering the image noise. As the image noise generally has the high frequency response, it would design a series of low pass filter for noise suppression. This kind of filters typically can be an average filter, a bilateral filter and so on, and most of them are Finite Impulse Response (FIR) filter which is easy to design.

In prior art, generally, the above mentioned filters usually uses preset filtering templates for noise filtering.

Generally, the bigger the template is, the cleaner the noise is filtered, but accordingly the calculation thereof is more complicated and the operand is bigger, and it makes the image more blurring, and reduces the image quality.

While if the template gets smaller, the noise would not be easy to be filtered out, and it would not improve the image quality of the original image.

Considering the mentioned problems in prior art, a preferred embodiment according to the invention provides a method for filtering image noise out.

Before implementing the method for filtering image noise out, acquiring a YUV image firstly;

In preferred embodiments according to the invention, if the image digitally acquired is a RGB image, then convert the digitally acquired RGB image into YUV color system at first.

In prior art, there are mature implementation models for the conversion from RGB to YUV, and the technical scheme of this invention does not focus on how the RGB image is converted to YUV color system, therefore the implementation model of the system is not discussed extensively here.

In the preferred embodiments of the invention, if the digitally acquired image itself is a YUV image, it is unnecessary to make the conversion from RGB to YUV.

In the preferred embodiments of the invention, select a pixel in a color channel which has not been filtered in the image for detection;

In the preferred embodiments of the invention, the 'a pixel in a color channel' refers to a pixel in Y plane, U plane or V plane of a YUV color system.

In the preferred embodiments of the invention, a selected color channel is a color channel of which the noise has not been filtered to ensure that the noise filtering of the image of the color will not be repeated.

The following steps show the detection of one pixel of one color channel. In another word, through the following steps it can detect or filter a pixel in Y plane, U plane or V plane.

In the preferred embodiments of the invention, once all the pixels in all the color channels of the image have been filtered, it means the noise filtering to the entire image is complete.

For example, once every pixel which is located in Y plane, U plane and V plane individually has been filtered, it means the noise filtering of the entire image is complete.

In the preferred embodiments of the invention, the noise filtering to the pixels in Y plane is for filtering luma noise out; the noise filtering to the pixels in U plane or/and V plane is for filtering color noise out.

In the preferred embodiments of the invention, then, judging whether a pixel currently detected is in a flat region in accordance with all the pixels in the N*M matrix which centers on the pixel currently detected.

In the preferred embodiments of the invention, as described above, when filters are designed for noise filtering, it generally utilizes a few preset filtering templates. These filtering templates include the pixel ready to be filtered and the pixels of its neighborhood. All the pixels in the filtering template are considered in the calculation for the noise filtering of the current pixels.

Figures 4, 5, 6, 7:
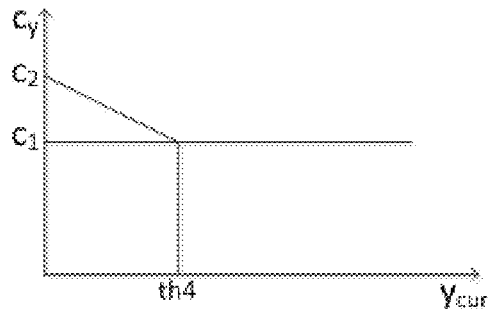
FIGS. 4 and 5 are schematic diagrams of performing image noise filtering in accordance with the U-component of the pixel, and the filtering template is a 3*3 matrix, in a preferred embodiment of the present invention.
FIG. 6 is a coordinate curve diagram of the middle filtering strength parameter in a preferred embodiment of the present invention.
FIG. 7 is schematic diagrams of the calculation of filtering strength parameter with the Y-component of the pixel, and the filtering template is a 3*3 matrix, in a preferred embodiment of the present invention.

Therefore, in the preferred embodiments of the invention, the described N*M matrix is the filtering template used in the technical scheme according to this invention. The filtering template takes the pixel ready to be filtered as the center point of the matrix, and it includes all the pixels within the scope of the N*M matrix (as shown in FIG. 4, a 3*3 matrix template). In the preferred embodiments of the invention, an N*M matrix template is utilized for filtering noise out in the image.

In the preferred embodiments of the invention, N≥3, M≥3, both N and M are odd numbers, so that it can ensure the representation of the value of the current detected pixel in a center point; the number of the rows and columns of the matrix is not 1; and it can judge whether the pixel currently detected is in flat region.

The method for judging whether the pixel currently detected is in the flat region will be described in detail hereinafter.

In the preferred embodiments of the invention, once it is judged that the pixel currently detected is in a flat region, the following steps as shown in FIG. 1 are executed:

Step S1, calculating and outputting a filtering strength parameter which is corresponding to the pixel currently detected in accordance with a Y-component of all the pixels in the N*M matrix;

In the preferred embodiments of the invention, likewise, calculating the filtering strength of the pixel currently detected in accordance with all the pixels in the filtering template.

The implementation method of calculating the filtering strength of the pixel currently detected in accordance with the Y-component is described in detail hereinafter.

Step S2, filtering the pixel currently detected in accordance with the filtering strength parameter;

In the preferred embodiments of the invention, in step S2, according to the calculated the filtering strength parameter, filter the noise out of the pixel currently detected via IIR (Infinite Impulse Response) filter. The IIR filter is described hereinafter. In the preferred embodiments of the invention, in step S2, if it is judged that the pixel currently detected is not in a flat region, performing the average filtering to the pixel. Further, the average filtering in the preferred embodiments according to this invention is an average filtering with weight, which is to perform the average filtering to the pixels included in the above mentioned filtering template selectively.

The process of the mentioned average filtering is described hereinafter.

Step S3, accomplishing the image noise filtering process performed to the pixel in the color channel.

In the preferred embodiments of the invention, after performing step S3, performing the following steps:

judging whether to perform the image noise filtering process to every pixel in the color channel in the image;

if not performing the image noise filtering process to every pixel in the color channel in the image, turning to detect a pixel which has not been detected; and once it is determined that the pixel currently detected is in a flat region, performing steps S1 to S3.

In the preferred embodiments of the invention, if every pixel in the color channel in the image has been implemented with the image noise filtering process, performing the steps as follows:

judging whether to perform the image noise filtering process to every color channel in the image;

if not performing the image noise filtering process to every color channel in the image, turning to the color channel, and selecting a pixel to detect; and once it is determined that the pixel currently detected is in a flat region, performing steps S1 to S3.

In the preferred embodiments of the invention, the steps S1 to S3 refer to the process of filtering one pixel of one channel in the image. Therefore, it is necessary to perform steps S1 to S3 to all the pixels in the color channel so that the selected color channel can be filtered.

Likewise, it is necessary to perform steps S1 to S3 to every pixel of all the selected color channels in the image so that the entire image can be filtered.

In the preferred embodiments of the invention, during the judgment to whether the pixel currently detected is in a flat region, if the pixel currently detected is not in a flat region, performing the average filtering to the pixel correspondingly, that is to perform the image noise filtering via different filtering strategy in accordance with whether the pixel currently detected is in the flat region.

Through combining the steps described above, a complete process of image noise filtering in a preferred embodiment of this invention can be obtained, which comprises:

firstly, acquiring a YUV image, and judging whether the pixel currently detected in the image is in a flat region:

if the pixel currently detected is in a flat region, performing the image noise filtering process of steps S1 to S3, and the image noise filtering may be IIR filtering;

if the pixel currently detected is not in a flat region, performing the corresponding average filtering;

then judging whether every pixel in all the color channels in the image have been filtered:

if all the pixels in all the color channels in the image has been filtered by an image noise filtering, it means that the image noise filtering is complete;

if there is any unfiltered pixel, returning to perform the corresponding image noise filtering.

It describes the detailed process of performing the image noise filtering to one pixel selected in U plane of a preferred embodiment of this invention, which is the detailed process of the image noise filtering in accordance with the U-component of one pixel, and it helps the skilled in the art to understand the technical scheme of the invention better.

The U-component exampled hereinafter can be replaced with Y-component or V-component, therefore the following formulas are the general formulas which Y-component, U-component or V-component can be substituted into.

In the preferred embodiments of the invention, to judge whether the pixel currently detected in the image is in a flat region includes:

1. calculating the difference value in the maximum range of the N*M matrix which centers on the pixel currently detected, and judging whether the difference value is less than a preset first threshold value $th_1$, and outputting a corresponding first judgment result:

In the preferred embodiments of the invention, calculating the difference value in the maximum range in accordance with the following formulas:

$$h = |a_1 - a_2|; \quad (1)$$

wherein, $$a_1 = \sum\nolimits_{i=0, j=0}^{i \leq \frac{N-3}{2}, j \leq M-1} X_{i,j}; \quad (2)$$

$$a_2 = \sum\nolimits_{i=\frac{N+1}{2}, j=0}^{i \leq N-1, j \leq M-1} X_{i,j}; \quad (3)$$

where, $X_{i,j}$ represents the value of the pixel which is located in the (i+1)th row and the (j+1)th column of the preset N*M matrix in the selected color channel;

The formulas (2) and (3) represent the summation of all the rows before the row of the pixel currently detected and the summation of all the rows after the row of the pixel currently detected individually.

$$v=|b_1-b_2|;\quad(4)$$

wherein, $$b_1 = \sum_{i=0,j=0}^{i\leq N-1, j\leq \frac{M-3}{2}} X_{i,j};\quad(5)$$

$$b_2 = \sum_{i=0,j=\frac{M+1}{2}}^{i\leq N-1, j\leq M-1} X_{i,j};\quad(6)$$

The formulas (5) and (6) represent the summation of all the columns before the column of the pixel currently detected and the summation of all the columns after the column of the pixel currently detected individually.

Then, the mentioned difference value in the maximum range is the value calculated from the maximum value between h and v.

For example, in a 3*3 matrix, first, calculate the summation of all the rows before the row of the pixel currently detected, which is to calculate the summation of the pixel value of the first row, and calculate the summation of all the rows after the row of the pixel currently detected, which is to calculate the summation of the pixel value of the last row; and finally, calculate the difference value of the two summations mentioned above;

It is similar to the pixel value of column: for example, in a 3*3 matrix, similarly, first, calculate the summation of all the columns before the column of the pixel currently detected, which is to calculate the summation of the pixel value of the first column, and calculate the summation of all the column after the column of the pixel currently detected, which is to calculate the summation of the pixel value of the last column; and finally, calculate the difference value of the two summations mentioned above;

In the preferred embodiments of the invention, implementing the maximum value calculation at last to obtain the final difference value in the maximum range max (h, v).

Take the U-component of the 3*3 matrix shown in FIG. 4 as an example, the formulas (1) to (6) can be expressed as:

$$h=|u_{0,0}+u_{0,1}+u_{0,2}-u_{2,0}-u_{2,1}-u_{2,2}|;\quad(7)$$

In FIG. 4, $u_{1,1}$ is the value of the pixel currently detected in U plane, which is the U-component of the pixel currently detected. The other value of U is the U-component of the pixel included in the preset 3*3 matrix which centers on $u_{1,1}$, and it need not be repeated hereinafter.

Then, implement the maximum value calculation max (h, v) to obtain the difference value in the maximum range.

In the preferred embodiments of the invention, comparing the difference value in the maximum range max (h, v) and the preset first threshold value $th_1$, and outputting the corresponding first judgment result.

2. Calculating the variance of all the pixels in the preset N*M matrix which centers on the pixel currently detected, and comparing the variance with the corresponding preset second threshold value $th_2$, and outputting a corresponding second judgment result.

Calculate the variance with the following formulas:

$$X_{var} = \sum_{i=0,j=0}^{i=N-1,j=M-1} \left(X_{i,j} - X_{(\frac{N-1}{2}),(\frac{M-1}{2})}\right);\quad(8)$$

wherein, $X_{var}$ represents the variance value of the value of all the pixels included in the preset N*M matrix in the selected color channel;

$$X_{(\frac{N-1}{2}),(\frac{M-1}{2})}$$

is the value of the pixel currently detected in the color channel in the described preset N*M matrix;

$X_{i,j}$ represents the value of the pixel in (i+1)th row and (j+1)th column of the preset N*M matrix in the selected color channel.

In the preferred embodiments of the invention, once the described variance $X_{var}$ is obtained through calculation, compare $X_{var}$ with the preset second threshold $th_2$, and output the corresponding second judgment result.

Take the U-component of the pixels inside the 3*3 matrix shown in FIG. 4 as an example, the formula (7) can be presented as:

$$u_{var}=\sum_{i=0,j=0}^{i=2,j=2}(u_{i,j}-u_{1,1});\quad(9)$$

In the preferred embodiments of the invention, compare the variance value $u_{var}$ with the preset second threshold $th_2$ to output the corresponding second judgment result.

3. Calculating and judging whether the maximum distance, between the value of the filtered pixel in the first row and the pixel currently detected, is less than a preset third threshold value $th_3$, and outputting a corresponding third judgment result;

Calculate the mentioned maximum distance with the following formulas:

$$\max\_X'=\max(X'_{0,0}, X'_{0,1}, \ldots, X'_{0,A});\quad(10)$$

$$\min\_X'=\min(X'_{0,0}, X'_{0,1}, \ldots, X'_{0,A});\quad(11)$$

wherein, $X'_{0,A}$ represents the value of the filtered pixel in the first row and (A+1)th column of the preset 3*M matrix, in the selected color channel; for example, $X'_{0,0}$ represents the value of the pixel $X_{0,0}$ in the first row and the first column after being filtered;

$A \leq M-1$;

then:

$$X_{diff1} = \left|\max\_X' - X_{1,(\frac{M-1}{2})}\right|;\quad(12)$$

$$X_{diff2} = \left|\min\_X' - X_{1,(\frac{M-1}{2})}\right|;\quad(13)$$

and the maximum distance is:

$$X_{max\_diff}=\max(X_{diff1}, X_{diff2});\quad(14)$$

In the preferred embodiments of the invention, compare the maximum distance $X_{max\_diff}$, which is obtained from the above mentioned calculation, with the preset third threshold $th_3$ to output the corresponding third judgment result.

Take the U-component of the pixels in the 3*3 matrix shown in FIG. 5 as an example, and the formulas (10) to (14) can be expressed as:

$$\max\_u'=\max(u'_{0,0}, u'_{0,1}, u'_{0,2});\quad(15)$$

$$\min\_u'=\min(u'_{0,0}, u'_{0,1}, u'_{0,2});\quad(16)$$

$$u_{diff1}=|\max\_u'-u_{1,1}|;\quad(17)$$

$$u_{diff2}=|\min\_u'-u_{1,1}|; \quad (18)$$

$$u_{max\_diff}=\max(u_{diff1}, u_{diff2}); \quad (19)$$

In the preferred embodiments of the invention, compare $u_{min\_diff}$ with the preset third threshold $th_3$, and outputting the third judgment result.

In the preferred embodiments of the invention, based on the three judgment results, for the pixel currently detected in the color channel, if the variance value of the maximum range max (h, v)<$th_1$, and the variance value $X_{var}$<$th_2$, and the maximum distance $X_{max\_diff}$<$th_3$, it is determined the pixel currently detected in the color channel is in a flat region, for example:

If max (h, v)<$th_1$, $u_{var}$<$th_2$, and $u_{max\_diff}$<$th_3$, it is determined the pixel currently detected of the U plane is in a flat region.

On the contrary, under the rest cases, judge whether the pixel currently detected in the color channel is not in a flat region; in another word, for the pixel currently detected in the color channel, if the variance value in the maximum range max (h, v)$\ddagger th_1$, and/or the variance value $X_{var}\ddagger th_2$, and/or the maximum distance $X_{max\_diff}\ddagger th_3$, judge whether the current detected pixel in the color channel is not in a flat region; in another word, for example:

If max (h, v)$\ddagger th_1$, and/or $u_{var}\ddagger th_2$, and/or $u_{max\_diff}\ddagger th_3$, it is determined the current detected pixel of the U plane is not in a flat region.

Figure 2:
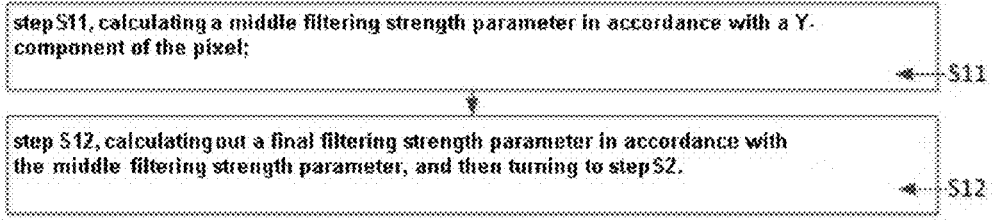
FIGS. 2 and 3 are flow charts, which describes the method for filtering image noise out in a preferred embodiment of the present invention.

In the preferred embodiments of the invention, as shown in FIG. 2, the step S1 specifically includes:

Step S11, calculating a middle filtering strength parameter in accordance with a Y-component of the pixel;

In the preferred embodiments of the invention, FIG. 5 is the coordinate curve diagram of the middle filtering strength parameter;

According to the Y-component of the current detected pixel, the corresponding middle filtering strength parameter can be calculated in accordance with the following formulas:

$$c_y = \begin{cases} c_1 + (th_4 - y_{cur}) * (c_2 - c_1)/th_4 & y_{cur} < th_4 \\ c_1 & y_{cur} \ddagger th_4 \end{cases}; \quad (20)$$

wherein, $c_y$ represents the middle filtering strength parameter;

$c_1$ and $c_2$ are preset threshold value (please refer to the coordinate curve diagram shown in FIG. 6);

$$c_1 \pounds c_y \pounds c_2; \quad (21)$$

$$0<c_1<c_2<1; \quad (22)$$

$th_4$ represents the preset forth threshold value;

$y_{cur}$ represents the average brightness of all the pixels, which includes the pixels currently detected in the color channel, in the preset N*M matrix:

$$y_{cur} = \frac{1}{N*M} * \sum_{i=0, j=0}^{i<N, j<M} y_{i,j}; \quad (23)$$

$y_{i,j}$ represents Y-component of the pixel in the (i+1)th row and (j+1)th column of the preset N*M matrix.

As shown in FIG. 7, in the preferred embodiments of the invention, in a preset 3*3 template, calculate the middle filtering strength parameter in accordance with Y-component of the pixel currently detected, thus the mentioned formula (23) may be expressed as:

$$y_{cur} = \frac{1}{9} * \sum_{i=0, j=0}^{i<3, j<3} y_{i,j}; \quad (24)$$

step S12, calculating out a final filtering strength parameter in accordance with the middle filtering strength parameter, and then turning to step S2.

Figure 8:
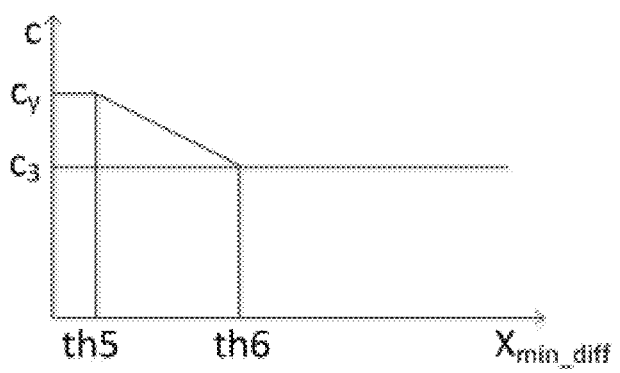
FIG. 8 is a coordinate curve diagram of the filtering strength parameter in a preferred embodiment of the present invention.

In the preferred embodiments of the invention, according to the middle filtering strength parameter calculated from step S11, calculate the final filtering strength parameter in accordance with the following formulas:

$$c = \begin{cases} c_y & X_{max\_diff} \pounds th_5 \\ \frac{(c_y - c_3) * (th_6 - X_{min\_diff})}{th_6 - th_5} & th_5 < X_{max\_diff} < th_6 \\ c_3 & X_{max\_diff} \ddagger th_6 \end{cases}; \quad (25)$$

wherein, c represents the filtering strength parameter;

$c_3$ is the preset threshold value (please refer to the coordinate curve diagram shown in FIG. 8);

$$c_3 \pounds c \pounds c_y; \quad (26)$$

$$0<c_3<c_y<1; \quad (27)$$

$X_{max\_diff}$ represents the maximum distance between the pixels currently detected and the value of the filtered pixel in the first row of the preset 3*M matrix:

$th_5$ is the preset fifth threshold;

$th_6$ is the preset sixth threshold;

$$th_5 < th_6 \pounds th_3 \quad (28)$$

Therefore, in the preferred embodiments of the invention, applying the filtering strength parameter c, which calculated from the formulas mentioned above, to the IIR filter performed to the pixel currently detected in the color channel may be expressed as follows:

$$X'_{(\frac{N-1}{2}),(\frac{M-1}{2})} = \quad (29)$$

$$\frac{1}{M} * \sum_{j=0}^{j<M} (c^2 * X'_{0,j} + c*(1-c)*X_{1,j} + (1-c)*X_{2,j});$$

Take the pixels in the U plane of the 3*3 template shown in FIGS. 4-5 as an example, the formula (29) can be expressed as:

$$u'_{1,1} = \frac{1}{3} * \sum_{j=0}^{j<3} (c^2 * X'_{0,j} + c*(1-c)*X_{1,j} + (1-c)*X_{2,j}); \quad (30)$$

Therefore, once it is judged that the pixel in a color channel is in a flat region, complete the performance of the IIR filtering mentioned above.

Figure 3:
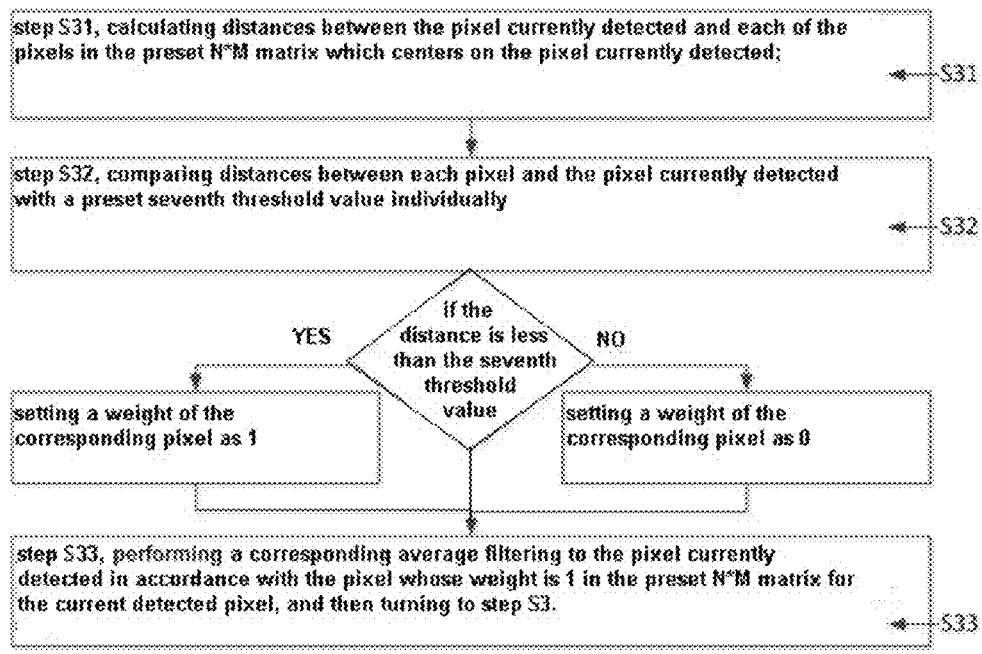

In the preferred embodiments of the invention, as shown in FIG. 3, the performance of average filtering mentioned above specifically includes: step S31, calculating distances between the pixel currently detected and each of the pixels in the preset N*M matrix which centers on the pixel currently detected;

step S32, comparing distances between each pixel and the pixel currently detected with a preset seventh threshold value individually:

if the distance is less than the seventh threshold value, set the weight of the corresponding pixel into 1;

if the distance is not less than the seventh threshold value, set the weight of the corresponding pixel into 0;

In the preferred embodiments of the invention, calculate the distance between pixels according to the following steps, and do the corresponding judgment:

$$\left|X_{i,j} - X_{\left(\frac{N-1}{2}\right),\left(\frac{M-1}{2}\right)}\right| < th_7; \quad (31)$$

$$X'_{\left(\frac{N-1}{2}\right),\left(\frac{M-1}{2}\right)}$$

represents the value of the pixel currently detected after being filtered in the preset N*M matrix;

$X_{i,j}$ represents the value of the pixel in the (i+1)th row and the (j+1)th column of the preset N*M matrix;

if the above judgment is right, that is if the distance between one pixel and the pixel currently detected is less than the preset sixth threshold value, set the weight of the corresponding pixel into 1;

if the above judgment is wrong, that is if the distance between one pixel and the pixel currently detected is not less than the preset sixth threshold value, set the weight of the corresponding pixel into 0.

step S33, performing a corresponding average filtering to the pixel currently detected in accordance with the pixel whose weight is 1 in the preset N*M matrix for the current detected pixel, and then turning to step S3.

In the preferred embodiments of the invention, according to following formulas, perform the average filtering in accordance with the formula as follows to get the final filtering result:

$$X'_{\left(\frac{N-1}{2}\right),\left(\frac{M-1}{2}\right)} = \frac{1}{P} * \sum_{i=0,j=0}^{i=N,j=M} X_{i,j}; \quad (32)$$

in another word, in the preferred embodiments of the invention, discard the pixels of which the weight is 0, and only select the pixels, of which the weight is 1 in the N*M matrix, to perform average filtering;

then, P, which is in the formula (32), represents the number of the pixels, of which the weight is 1 (i.e. satisfy formula (31)), in the N*M matrix.

As shown in FIG. 4, utilize the preset 3*3 matrix, and take the detected pixel in the U plane as an example, the formulas (31) to (32) can be expressed as:

$$|u_{ij} - u_{11}| < th_7; \quad (33)$$

$$u'_{1,1} = \frac{1}{P} * \sum_{i=0,j=0}^{i=2,j=2} u_{i,j}; \quad (34)$$

In conclusion, the purpose of this invention is: according to all the pixels included in the preset filtering template, judging whether the pixel currently detected in the color channel (YUV color system) is in a flat region (via judging the difference value in maximum range, the variance and the maximum distance and other in the filtering template synthetically) to determine what filtering scheme should be utilized:

1). if the pixel currently detected in the color channel is in a flat region, calculate out the filtering strength parameter of the pixel currently detected (relate to magnitude and the Y-component) in accordance with the preset filtering template; and perform the IIR filtering to the pixel currently detected in the color channel in accordance with the calculated filtering strength parameter;

2). if the pixel currently detected in the color channel is not in a flat region, calculate out the distances between all the pixels and the pixel currently detected in accordance with the preset filtering template; and distribute the corresponding weight in accordance with the distances; then, perform the weighted average filtering to the pixels currently detected.

After performing the noise filtering to all the pixels in every color channel (YUV color system) in the image in accordance with the method mentioned above, the noise filtering for the entire image is complete.

Figure 9:
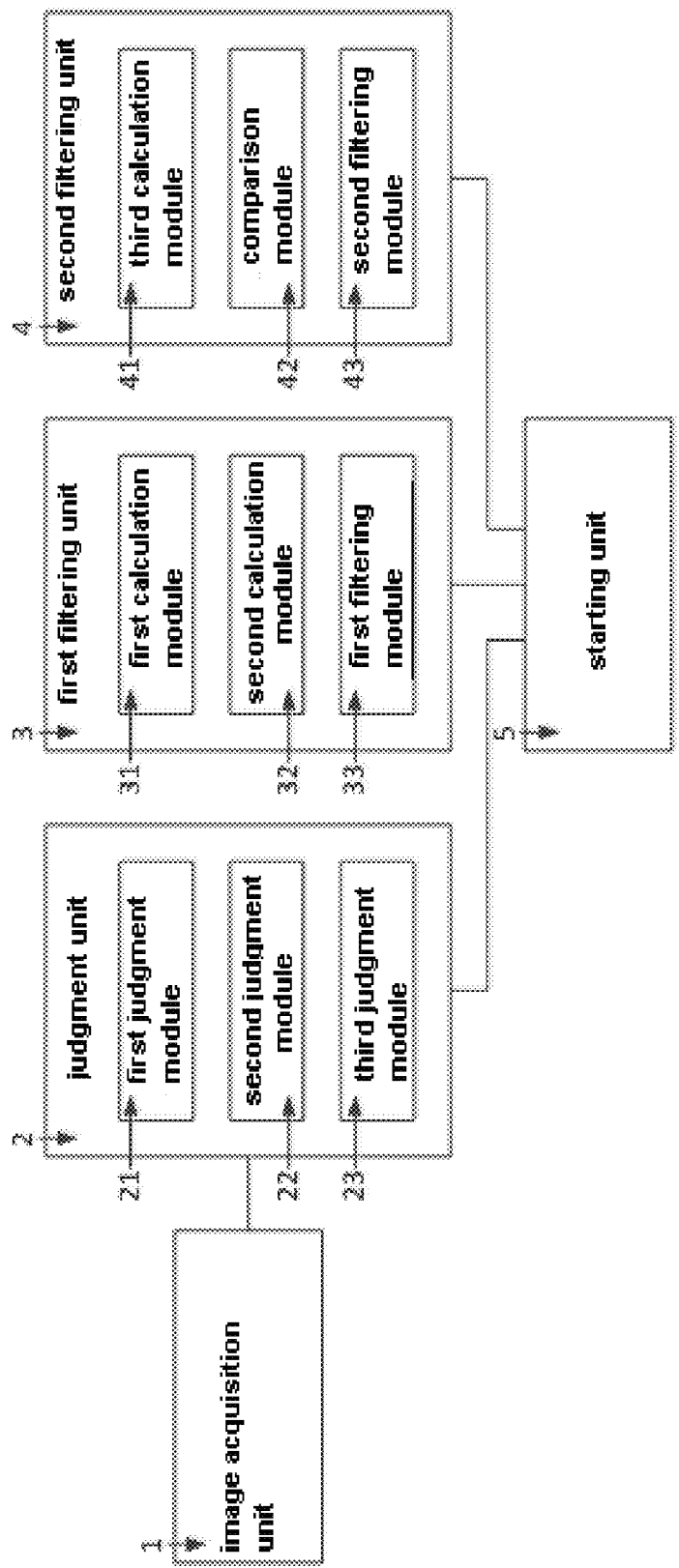
FIG. 9 is a structure diagram of an image noise filtering system in a preferred embodiment of the present invention.

In the preferred embodiments of the invention, it provides a system based on the mentioned method for filtering image noise out, specifically shown in FIG. 9, which comprises:

an image acquisition unit 1, configured to acquire RGB images to be processed, and convert the RGB images into a YUV color system;

in prior art, it is possible for the image acquisition unit 1 to convert RGB image into YUV color system, therefore it is not discussed extensively here.

In the preferred embodiments of the invention, if the acquired image is of YUV color system originally, it does not need to be converted.

a judgment unit 2, connected to the image acquisition unit 1, configured to judge whether a pixel currently detected is in a flat region in accordance with all pixels in a preset N*M matrix which centers on the pixel currently detected, and output a corresponding judgment result; in the preferred embodiments of the invention, the pixel currently detected is a pixel in a color channel of YUV color system in the image, for example, a pixel in Y plane, a pixel in U plane, or a pixel in V plane.

In the preferred embodiments of the invention, the judgment unit 2 further includes:

a first judgment module 21, configured to calculate a difference value in maximum range corresponding to the pixel currently detected in accordance with all the pixels of the preset N*M matrix, and to judge whether the difference value in the maximum range is less than a preset first threshold; and to output a corresponding first judgment result. In the preferred embodiments of the invention, the first judgment module 21 calculates and outputs the corresponding difference value in the maximum range in accordance with the method mentioned above, and judges whether the difference in the maximum range is less than the preset first threshold, and outputs the corresponding first judgment result.

a second judgment module 22, configured to calculate a variance value of all the pixels in the preset N*M matrix, and to judge whether the variance value is less than a preset second threshold, and to output a corresponding second judgment result. In the preferred embodiments of the invention, the second judgment module 22 calculates and outputs the corresponding variance value in accordance with the method mentioned above, and judges whether the variance value is less than a preset second threshold; and outputs the corresponding second judgment result.

a third judgment module 23, configured to calculate and judge whether a maximum distance between the value obtained after the pixel in first row of a preset 3*M matrix is filtered and the pixel currently detected is less than a preset third threshold, and to output a corresponding third judgment result. In the preferred embodiments of the invention, the third judgment module 23 calculates and outputs the corresponding maximum distance in accordance with the method mentioned above, and judges whether the maximum distance is less than the third threshold, and outputs the corresponding third judgment result.

In the preferred embodiments of the invention, judgment unit 2 judges the following in accordance with the first judgment result, the second judgment result and the third judgment result:

if the difference value in the maximum range is less than the first threshold, and the variance value is less than the second threshold, and the maximum distance is less than the third threshold, the judgment unit judges that the pixel currently detected is in a flat region; and otherwise, the judgment unit judges that the pixel currently detected is not in a flat region:

In the preferred embodiments of the invention, the system also comprises:

a first filtering unit 3, configured to calculate out a corresponding filtering strength parameter in accordance with all the pixels in the preset N*M matrix which centers on the pixel currently detected, and to filter the pixel currently detected in accordance with the filtering strength parameter;

In the preferred embodiments of the invention, the first filtering unit 3 performs IIR filtering to the pixel.

In the preferred embodiments of the invention, the first filtering unit 3 further includes:

a first calculation module 31, configured to calculate a middle filtering strength parameter corresponding to the pixel currently detected in accordance with all the pixels in the preset N*M matrix;

a second calculation module 32, connected to the first calculation module, configured to calculate a filtering strength parameter corresponding to the pixel currently detected in accordance with the middle filtering strength parameter;

a first filtering module 33, connected to the second calculation module, configured to filter the pixel currently detected in accordance with the filtering strength parameter;

In the preferred embodiments of the invention, according to the filtering strength parameter, use the value of all the pixels in the preset 3*M matrix which centers on the pixel currently detected to filter the pixel currently detected.

In the preferred embodiments of the invention, the system also includes:

a second filtering unit 4, configured to perform average filtering to the pixel currently detected;

In the preferred embodiments of the invention, the second filtering unit 4 performs the weighted average filtering for the pixel.

In the preferred embodiments of the invention, the second filtering unit 4 further includes:

a third calculation module 41, configured to calculate distances between all the pixels in the preset N*M matrix and the pixel currently detected;

a comparison module 42, connected to the third calculation module 41, configured to compare the distances corresponding to each pixel to a preset threshold, and to discard pixel values which are not less then the threshold;

a second filtering module 43, connected to the comparison module 42, configured to perform average filtering to the pixel currently detected in accordance with the values of the pixels, which are not discarded, in the preset N*M matrix.

a starting unit 5, connected to the judgment unit 2, the first filtering unit 3 and the second filtering unit 4, configured to start the first filtering unit in accordance with the judgment result if the pixel currently detected is in a flat region; and start the second filtering unit in accordance with the judgment result if the pixel currently detected is not in a flat region;

In the preferred embodiments of the invention, according to the judgment result outputted from the judgment unit 2, the starting unit 5 starts the first filtering unit 3 or the second filtering unit 4 selectively. In anther word, in the preferred embodiments of the invention:

if the pixel currently detected in the color channel is in a flat region, the first filtering unit 3 performs IIR filtering to it for image noise filtering purpose;

if the pixel currently detected in the color channel is not in a flat region, the second filtering unit 4 performs weighted filtering to it for image noise filter purpose.

The description listed above is detailed description of embodiments of the invention. It should be understood that the invention is not limited by the above embodiments. Any changes and modifications of the invention fall in the scope of the application for the skilled in the art. Therefore the changes and modifications made without departing from the spirit and scope of the invention fall in the scope of the invention.

What is claimed is:

1. A method for filtering image noise out, comprising:
   acquiring a YUV image, and performing image noise filtering process to an unfiltered pixel in a color channel in the image as follows;
   judging the pixel currently detected in accordance with all the pixels in a preset N*M matrix centering on the pixel currently detected; if the pixel currently detected is in a flat region, performing the following steps:
   step S1, calculating and outputting a filtering strength parameter which is corresponding to the pixel currently detected in accordance with a Y-component of all the pixels in the N*M matrix;
   step S2, filtering the pixel currently detected in accordance with the filtering strength parameter;
   step S3, accomplishing the image noise filtering process performed to the pixel in the color channel;
   wherein, N≥3, M≥3, and both N and M are odd numbers;
   wherein, the N*M matrix is a filtering template used in the method for filtering image noise out;
   wherein, if the pixel currently detected is not in a flat region in accordance with all the pixels in the preset N*M matrix centering on the pixel currently detected, performing the step as follows:
   performing an average filtering to the pixel currently detected, and then accomplishing the image noise filtering process performed to the pixel in the color channel;
   wherein judging whether the pixel currently detected is in a flat region comprises:
   calculating a difference value in the maximum range of the pixel corresponding to the pixel currently detected in accordance with all the pixels in the preset N*M matrix, and judging whether the difference value in the maximum range is less than a preset first threshold, and then outputting a corresponding first judgment result;

calculating a variance value of all the pixels in the preset N*M matrix, and judging whether the variance value is less than a preset second threshold, and then outputting a corresponding second judgment result;

calculating and judging whether maximum distance between values of filtered pixels in first row of a preset 3*M matrix is less than a preset third threshold value, and then outputting a corresponding third judgment result;

when judging whether the pixel currently detected is in a flat region, also judging the following in accordance with the first judgment result, the second judgment result and the third judgment result:

if the difference value in the maximum range is less than the first threshold, and the variance value is less than the second threshold, and the maximum distance is less than the third threshold, it is determined that the pixel currently detected is in a flat region; and otherwise, it is determined that the pixel currently detected is not in a flat region.

2. The method of claim 1, wherein after performing step S3, performing the steps as follows:

judging whether to perform the image noise filtering process to every pixel in the color channel in the image;

if not performing the image noise filtering process to every pixel in the color channel in the image, turning to detect a pixel which has not been detected; and performing steps S1 to S3 once it is determined that the pixel currently detected is in a flat region.

3. The method of claim 2, wherein, if performing the image noise filtering process to every pixel in the color channel in the image, performing the steps as follows:

judging whether to perform the image noise filtering process to every color channel in the image;

if not performing the image noise filtering process to every color channel in the image, turning to a next color channel, and selecting a pixel of the next color channel to detect; and performing steps S1 to S3 once it is determined that the pixel currently detected is in a flat region.

4. The method of claim 1, wherein calculating the difference value in the maximum range in accordance with the following formulas:

$$h = |a_1 - a_2|;$$

wherein, $$a_1 = \sum_{i=0, j=0}^{i \leq \frac{N-3}{2}, j \leq M-1} X_{i,j};$$

$$a_2 = \sum_{i=\frac{N+1}{2}, j=0}^{i \leq N-1, j \leq M-1} X_{i,j};$$

$X_{i,j}$ represents a value of a pixel which is located at (i+1)th row and (j+1)th column of the preset N*M matrix in the color channel;

$$v = |b_1 - b_2|;$$

wherein, $$b_1 = \sum_{i=0, j=0}^{i \leq N-1, j \leq \frac{M-3}{2}} X_{i,j};$$

$$b_2 = \sum_{i=0, j=\frac{M+1}{2}}^{i \leq N-1, j \leq M-1} X_{i,j};$$

then calculating maximum value max (h, v) between h and v as the difference value in the maximum range.

5. The method of claim 1, wherein calculating the variance value in accordance with the following formula:

$$X_{var} = \sum_{i=0,j=0}^{i=N-1, j=M-1} \left( X_{i,j} - X_{(\frac{N-1}{2}),(\frac{M-1}{2})} \right);$$

wherein, $X_{var}$ represents the variance value of all the pixels included in the preset N*M matrix in the color channel;

$$X_{(\frac{N-1}{2}),(\frac{M-1}{2})}$$

is the value of the pixel currently detected in the preset N*M matrix in the color channel;

$X_{i,j}$ represents a value of a pixel located in (i+1)th row and (j+1)th column of the preset N*M matrix in the selected color channel.

6. The method of claim 1, wherein calculating the maximum distance in accordance with the following formulas:

$$\max\_X' = \max(X'_{0,0}, X'_{0,1}, \ldots, X'_{0,A});$$

$$\min\_X' = \min(X'_{0,0}, X'_{0,1}, \ldots, X'_{0,A});$$

wherein, $A \leq M-1$;

$X'_{0,A}$ represents the value of filtered pixels in first row and (A+1)th column of the preset N*M matrix;

then:

$$X_{diff1} = \left| \max\_X' - X_{1,(\frac{M-1}{2})} \right|;$$

$$X_{diff2} = \left| \min\_X' - X_{1,(\frac{M-1}{2})} \right|;$$

and the maximum distance is:

$$X_{max\_diff} = \max(X_{diff1}, X_{diff2});$$

judging whether $X_{max\_diff}$ is less than the corresponding third threshold, and outputting the corresponding third judgment result.

7. The method of claim 1, wherein step S1 comprises:

step S11, calculating a middle filtering strength parameter in accordance with a Y-component of the pixel;

step S12, calculating out a final filtering strength parameter in accordance with the middle filtering strength parameter, and then turning to step S2.

8. The method of claim 7, wherein in step S11, calculating the middle filtering strength parameter in accordance with the following formulas:

$$c_y = \begin{cases} c_1 + (th_4 - y_{cur}) * (c_2 - c_1)/th_4 & y_{cur} < th_4 \\ c_1 & y_{cur} \ddagger th_4 \end{cases};$$

wherein, $c_y$ represents the middle filtering strength parameter;

$c_1$ and $c_2$ are present threshold values;

$c_1 \leq c_y \leq c_2$;

$0 < c_1 < c_2 < 1$;

$th_4$ represen preset forth threshold value;

$y_{cur}$ represents an average brightness of all the pixels, which includes the pixel currently detected in the color channel, in the preset N*M matrix:

$$y_{cur} = \frac{1}{N*M} * \sum_{i=0,j=0}^{i<N,j<M} y_{i,j};$$

$y_{i,j}$ represents Y-component of the pixel in the (i+1)th row and (j+1) column of the preset N*M matrix.

9. The method of claim 8, wherein in step S12, calculating the filtering strength parameter in accordance with the following formula:

$$c = \begin{cases} c_y & X_{max\_diff} \leq th_5 \\ \frac{(c_y - c_3)*(th_6 - X_{min\_diff})}{th_6 - th_5} & th_5 < X_{max\_diff} < th_6 \\ c_3 & X_{max\_diff} \geq th_6 \end{cases};$$

wherein,
c represents the filtering strength parameter;
$c_3$ is the preset threshold value;
$c_3 \leq c \leq c_y$;
$0 < c_3 < c_y < 1$;
$X_{max\_diff}$ represents the maximum distance between the pixel current detected and a value of the filtered pixel in first row of the preset N*M matrix:
$th_5$ is a preset fifth threshold;
$th_6$ is a preset sixth threshold;
$th_5 < th_6 \leq th_3$.

10. The method of claim 1, wherein in step S2, performing the image noise filtering process to the pixel currently detected in the color channel with the preset N*M matrix in accordance with the following formula:

$$X'_{1,(\frac{M-1}{2})} = \frac{1}{M} * \sum_{j=0}^{j<M} (c^2 * X'_{0,j} + c*(1-c)*X_{1,j} + (1-c)*X_{2,j});$$

wherein, $X'_{1,(\frac{M-1}{2})}$ represents a value of the filtered pixel in the color channel currently detected in the preset N*M matrix.

11. The method of claim 1, wherein the average filtering comprises:
step S31, calculating distances between the pixel currently detected and each of the pixels in the preset N*M matrix centering on the pixel currently detected;
step S32, comparing distances between each pixel and the pixel currently detected with a preset seventh threshold value individually:
if the distance is less than the seventh threshold value, setting a weight of the corresponding pixel as 1;
if the distance is not less than the seventh threshold value, setting a weight of the corresponding pixel as 0;
step S33, performing a corresponding average filtering to the pixel currently detected in accordance with the pixel whose weight is 1 in the preset N*M matrix for the current detected pixel, and then turning to step S3.

12. The method of claim 11, wherein performing the average filtering to the pixel currently detected in accordance with the following formulas:

$$X'_{(\frac{N-1}{2}),(\frac{M-1}{2})} = \frac{1}{P} * \sum_{i=0,j=0}^{i=N-1,j=M-1} X_{i,j};$$

$X'_{(\frac{N-1}{2}),(\frac{M-1}{2})}$ represents the value obtained after the pixel currently detected in the preset N*M matrix is filtered;
$X_{ij}$ represents a value of the pixel in (i+1)th row and (j+1)th column of the preset N*M matrix;
P represents that, in the N*M matrix, there are pixels, of which the number is P, satisfying:

$$\left| X_{i,j} - X_{(\frac{N-1}{2}),(\frac{M-1}{2})} \right| < th_7;$$

wherein,
$th_7$ represents the preset seventh threshold.

13. The method of claim 1, wherein in step S2, performing IIR (Infinite Impulse Response) filtering to the pixel in the color channel in accordance with the filtering strength parameter.

* * * * *

UNITED STATES PATENT AND TRADEMARK OFFICE
CERTIFICATE OF CORRECTION

PATENT NO. : 9,838,717 B2
APPLICATION NO. : 14/983893
DATED : December 5, 2017
INVENTOR(S) : Wei Wang It is certified that error appears in the above-identified patent and that said Letters Patent is hereby corrected as shown below:

In the Claims

In Claim 8, Column 20, Line 60, the formula should be corrected to read:

$$c_y = \begin{cases} c_1 + (th_4 - y_{cur}) * (c_2 - c_1) / th_4 & y_{cur} < th_4 \\ c_1 & y_{cur} \geq th_4 \end{cases};$$

In Claim 8, Column 20, Line 65:
DELETE "represen preset forth" and
INSERT --represents preset fourth--

In Claim 8, Column 21, Line 10:
INSERT --th-- after (j+1)

In Claim 9, Column 21, at Lines 16 and 20, the formula should be corrected to read:

$$c = \begin{cases} c_y & X_{max\_diff} \leq th_5 \\ \dfrac{(c_y - c_3) * (th_6 - X_{min\_diff})}{th_6 - th_5} & th_5 < X_{max\_diff} < th_6 \\ c_3 & X_{max\_diff} \geq th_6 \end{cases};$$

Signed and Sealed this
Twenty-third Day of October, 2018

Andrei Iancu
*Director of the United States Patent and Trademark Office*